United States Patent [19]

Topcik

[11] 3,855,378

[45] Dec. 17, 1974

[54] PROCESS FOR PREPARING CELLULAR RUBBER

[75] Inventor: Barry Topcik, Somerville, N.J.

[73] Assignee: Cities Service Company, Tulsa, Okla.

[22] Filed: June 28, 1973

[21] Appl. No.: 374,717

[52] U.S. Cl............ 264/54, 260/2.5 EP, 260/2.5 H, 264/55, 260/2.5 HA, 260/23.5 A, 260/23.7 N, 260/23.7 H, 260/23.7 M, 260/42.44, 260/879, 260/880 R, 260/890, 260/881, 260/884
[51] Int. Cl............................................. B29h 7/20
[58] Field of Search............ 264/54, 55; 260/2.5 EP, 260/2.5 H, 2.5 HA

[56] References Cited
UNITED STATES PATENTS

| | | | |
|---|---|---|---|
| 3,098,831 | 7/1963 | Carr | 264/54 |
| 3,608,006 | 9/1971 | Hosoda et al. | 260/2.5 HA |
| 3,651,183 | 3/1972 | Hosoda et al. | 264/54 |

Primary Examiner—Melvyn I. Marquis
Attorney, Agent, or Firm—Patricia J. Hogan

[57] ABSTRACT

Closed-cell expanded rubber having a uniform cell structure is prepared by partially curing a vulcanizable rubber in the presence of a vulcanizing agent and a blowing agent at a temperature lower than that at which substantial decomposition of the blowing agent occurs and subsequently expanding and completing the cure of the partially cured rubber. If desired, the compositions which are treated in accordance with the invention may contain thermoplastic resins, antioxidants, processing aids, fillers, and other ingredients conventionally used in vulcanizable rubber compositions. According to a preferred embodiment of the invention, the rubber is butyl rubber or a mixture thereof with ethylene-propylene-diene terpolymer.

5 Claims, No Drawings

PROCESS FOR PREPARING CELLULAR RUBBER

BACKGROUND OF THE INVENTION

1. Field of the Invention

This invention relates to cellular rubber and more particularly relates to an improved process for preparing cellular rubber.

2. Description of the Prior Art

It is known that cellular rubber may be prepared by heating a mixture of vulcanizable rubber, vulcanizing agent, and blowing agent in a mold to decompose the blowing agent and effect a partial cure of the rubber, removing the partially cured rubber composition from the mold, and either allowing the hot molded composition to expand and undergo completion of curing or cooling it and then heating it to expand it and complete the curing. These prior art processes have the disadvantages of frequently leading to the formation of blistered articles and/or not permitting the formation from some rubbers of articles having as low a density as might be desired.

SUMMARY OF THE INVENTION

An object of the invention is to provide a novel process for preparing cellular rubber.

Another object is to provide such a process which minimizes the possibility of producing blistered articles.

A further object is to provide such a process which readily permits the formation of low density products.

These and other objects are attained by heating a composition comprising a vulcanizable rubber, a vulcanizing agent, and a blowing agent under pressure in a mold to initiate cure of the rubber at a temperature lower than that at which substantial decomposition of the blowing agent occurs, removing the partially cured rubber composition from the mold, and completing cure of the rubber at a higher temperature which permits substantial decomposition of the blowing agent and expansion of the composition.

DESCRIPTION OF THE PREFERRED EMBODIMENTS

The composition which is treated in accordance with the invention is not novel and has the ingredients conventionally present in cellular rubber-producing compositions, i.e., a vulcanizable rubber, a vulcanizing agent, a blowing agent, and optional additives, such as thermoplastic resins, antioxidants, processing aids, fillers, etc.

The rubber may be any vulcanizable natural or synthetic rubber but is preferably a butyl rubber, chlorinated butyl rubber, brominated butyl rubber, ethylene-propylene copolymer, ethylene-propylene-diene terpolymer, chlorosulfonated polythylene, natural rubber, synthetic polyisoprene, polybutadiene, butadiene-styrene copolymer, butadiene-acrylonitrile copolymer, polychloroprene, polyacrylate, polyepichlorohydrin, epichlorohydrin-ethylene oxide copolymer, or mixture thereof. Most preferably, the rubber is a butyl rubber or a mixture of a butyl rubber and an ethylene-propylene-diene terpolymer.

The vulcanizing agent may be any of the vulcanizing agents conventionally used to cure vulcanizable rubbers, e.g., sulfur, an organic disulfide, an organic peroxide, a dimethylol phenolic resin, polyazidoformate, N,-N'-dichloroazodicarbonamidine, etc., and includes any accelerators desired to speed curing. It is used, of course, in a curing amount.

The blowing agent may be any of the blowing agents normally employed in such compositions, i.e., a chemical blowing agent which decomposes to release a relatively inert gas, such as carbon dioxide or nitrogen, at elevated temperatures. Particularly suitable are azodicarbonamide, dinitrosopentamethylenetetramine, N,N'-dimethyl-N,N'-dinitrosoterephthalimide, azobisisobutyronitrile, benzenesulfonhydrazide, 4,4'-oxybisbenzenesulfonhydrazide, p-toluenesulfonsemicarbazide, trihydrazinotriazine, barium azodicarboxylate, etc., especially azodicarbonamide. The amount of blowing agent employed, as in conventional processes, varies with the density desired for the final product.

As indicated above, the composition may contain a thermoplastic resin if desired. When employed, the thermoplastic resin may be any such resin which is compatible with the rubber but is preferably a polyethylene, ethylene-vinyl acetate copolymer, chlorinated polyethylene, polypropylene, polybutylene, polyvinyl chloride, vinyl chloride-vinyl acetate copolymer, polyvinylidene chloride, vinylidene chloride-vinyl chloride copolymer, polyvinyl ether, polystyrene, styrene-butadiene copolymer, or mixture thereof. The thermoplastic resin may comprise up to about 80 percent of the combined weights of rubber and resin and normally, when employed, constitutes about 5–80 percent of these combined weights.

In the practice of the invention, the rubber is partially cured before substantial decomposition of the blowing agent is permitted, so that it will be strong enough to withstand the pressure of expanding gas. This partial curing is accomplished under pressure in a mold at a temperature which is lower than that at which substantial decomposition of the blowing agent occurs. Obviously, the preferred temperature varies with the blowing agent being employed, but it is usually in the range of about 220°–400°F., most commonly about 280°–310°F. This temperature is maintained for a suitable time, usually about 5 minutes to about 4 hours, most commonly about 5–30 minutes, the shorter heating times being employed at the more elevated temperatures. Since there is no substantial decomposition of the blowing agent in the mold, extreme pressures on the mold are unnecessary. A pressure of about 1,000–2,000 psi is frequently satisfactory.

When the rubber has been partially cured, the composition is removed from the mold. It may then be directly heated to a temperature which permits substantial decomposition of the blowing agent, or it may be allowed to cool before being heated to that temperature. The temperature at which expansion and completion of curing is accomplished is, obviously, higher than that at which the partial curing was accomplished. The preferred temperature varies with the blowing agent being employed but is usually in the range of about 300°–420°F., most commonly about 350°–375°F. This temperature is maintained for a suitable time, conveniently about 15–45 minutes when the temperature is about 350°–375°F.

The product of the process is a closed-cell expanded rubber having a uniform cell structure. Depending on the parameters of the process, it may have a fairly high density or a density as low as about three pounds/cubic foot. The invention is particularly advantageous in the preparation of the low density rubbers, i.e., those having densities of up to 10 pounds/cubic foot, which are not easily prepared by prior art processes. It is also advantageous in that it minimizes the possiblility of producing blistered articles.

The following examples are given to illustrate the invention and are not intended as a limitation thereof. Unless otherwise specified, quantities mentioned are quantities by weight.

EXAMPLE I

Prepare a rubber composition from 70.0 parts of butyl rubber, 30.0 parts of ethylene-propylene-1,4-hexadiene terpolymer, 5.0 parts of zinc oxide, 1.0 part of stearic acid, 1.0 part of polyethylene glycol, 20.0 parts of aromatic hydrocarbon resin, 10.0 parts of paraffin oil, 0.5 part of 2,2'-methylenebis(4-methyl-6-t-butylphenol), 50.0 parts of talc, 1.0 part of zinc dimethyldithiocarbamate, 0.5 part of 1,3-diethylthiourea, 1.0 part of tetramethylthiuramdisulfide, 0.5 part of sulfur, 0.5 part of 4,4'-dithiodimorpholine, and 9.0 parts of azodicarbonamide.

Press cure the composition in an 8 × 8 × ½ inch cavity mold for 15 minutes at 300°F. Remove the hot molded slab from the mold and measure it. Its size is 9 × 9 inches.

Place the slab in an oven and heat it at 375°F. for 15 minutes. Cool it and measure and test it. The expanded slab is 16⅜ × 16⅜ inches and has a density of 8.0 pounds/cubic foot, a Shore 00 hardness (skin surface) of 37, and a Shore 00 hardness (split surface) of 35.

EXAMPLE II

Repeat Example I except for increasing the amount of azodicarbonamide to 11.0 parts. The hot molded slab is 9⅜ × 9¼ inches. The expanded slab is 18⅛ × 17⅞ inches and has a density of 6.2 pounds/cubic foot, a Shore 00 hardness (skin surface) of 30, and a Shore 00 hardness (split surface) of 29.

EXAMPLE III

Repeat Example I except for increasing the amount of azodicarbonamide to 13.0 parts. The hot molded slab is 9¾ × 9⅞ inches. The expanded slab is 19¼ × 19 inches and has a density of 5.1 pounds/cubic foot, a Shore 00 hardness (skin surface) of 27, and a Shore 00 hardness (split surface) of 26.

EXAMPLE IV

Prepare a rubber composition from 35.0 parts of butyl rubber, 65.0 parts of low density polyethylene, 1.0 part of polyethylene glycol, 20.0 parts of aromatic hydrocarbon resin, 2.5 parts of zinc oxide, 1.0 part of a stearic acid, 30.0 parts of talc, 8.5 parts of azodicarbonamide, 1.05 parts of zinc dimethyldithiocarbamate, 0.4375 part of 1,3-diethylthiourea, and 0.175 part of sulfur.

Press cure the composition in an 8 × 8 × ½ inch cavity mold for 15 minutes at 300°F. Remove the hot molded slab from the mold and measure it. Its size is 14 × 14 inches.

Place the slab in an oven and heat it at 375°F. for 30 minutes. Cool it and measure and test it. The expanded slab is 18⅛ × 15¾ inches and has a density of 5.7 pounds/cubic foot, a Shore 00 hardness (skin surface) of 74, and a Shore 00 hardness (split surface) of 68.

EXAMPLE V

Prepare a rubber composition from 70.0 parts of butyl rubber, 30.0 parts of ethylene-propylene-1,4-hexadiene terpolymer, 100.0 parts of low density polyethylene, 3.5 parts of polyethylene glycol, 7.5 parts of zinc oxide, 1.0 part of stearic acid, 17.0 parts of aromatic hydrocarbon resin, 10.0 parts of paraffin oil, 0.5 part of 2,2'-methylenebis(4-methyl-6-t-butylphenol), 5.0 parts of petrolatum, 1.0 part of processing aid, 13.0 parts of azodicarbonamide, 1.0 part of zinc dimethyldithiocarbamate, 1.0 part of 1,3-diethylthiourea, 1.0 part of a mixture of tetramethyl and tetraethyl thiuramdisulfides, 0.5 part of sulfur, and 0.5 part of 4,4'-dithiodimorpholine.

Press cure the composition in an 8 × 8 × ¾ inch cavity mold for 25 minutes at 305°F. Remove the hot molded slab from the mold and measure it. Its size is 9¾ × 9½ inches.

Place the slab in an oven and heat it at 350°F. for 30 minutes. Cool it and measure and test it. The expanded slab is 16⅝ × 14⅞ inches and has a density of 6.7 pounds/cubic foot.

EXAMPLE VI

Prepare a rubber composition from 70.0 parts of a butadiene-styrene copolymer having a combined styrene content of 23.5 percent, 60.0 parts of a 1:1 mixture of a butadiene-styrene copolymer having a combined styrene content of 23.5 percent and a styrene-butadiene copolymer having a combined styrene content of about 85 percent, 60.0 parts of clay, 10.0 parts of paraffin oil, 10.0 parts of hydrocarbon resin, 5.0 parts of zinc oxide, 2.0 parts of stearic acid, 10.0 parts of azodicarbonamide, 0.75 part of benzothiazyl disulfide, and 2.5 parts of sulfur.

Press cure the composition in an 8 × 8 × ½ inch cavity mold for 25 minutes at 290°F. Remove the hot molded slab from the mold and measure it. Its size is 12 × 12 inches.

Place 350°slab in an oven and heat it at 350+F. for 15 minutes. Cool it and measure and test it. The expanded slab is 17⅜ × 17⅝ inches and has a density of 6.2 pounds/cubic foot, a Shore 00 hardness (skin surface) of 64, and a Shore 00 hardness (split surface) of 60.

EXAMPLE VII

Prepare a rubber composition from 50.0 parts of a rubbery butadiene-acrylonitrile copolymer, 50.0 parts of polyvinyl chloride, 50.0 parts of talc, 30.0 parts of dioctyl phthalate, 1.0 part of processing aid, 5.0 parts of zinc oxide, 0.5 part of stearic acid, 10.0 parts of azodicarbonamide, 1.0 part of 2,2'-methylenebis(4-methyl-6-t-butylphenol), 2.0 parts of calcium stearate, 0.75 part of benzothiazyl disulfide, and 1.5 parts of sulfur.

Press cure the composition in an 8 × 8 × ½ inch cavity mold for 30 minutes at 300°F. Remove the hot molded slab from the mold and measure it. Its size is 10⅝ × 10¾ inches.

Place the slab in an oven and heat it at 350°F. for 20 minutes. Cool it and measure and test it. The expanded slab is 17 × 17¼ inches and has a density of 8.1

EXAMPLE VIII

Prepare a rubber composition from 65.0 parts of ethylene-propylene-ethylidenenorbornene terpolymer, 65.0 parts of low density polyethylene, 35.0 parts of butyl rubber, 60.0 parts of talc, 2.0 parts of polyethylene glycol, 30.0 parts of paraffin oil, 5.0 parts of zince oxide, 1.0 part of stearic acid, 10.0 parts of azodicarbonamide, 1.0 part of processing aid, 1.0 part of a mixture of tetramethyl and tetraethyl thiuramdisulfides, 1.34 parts of zinc dimethyldithiocarbamate, 1.0 part of 1,3-diethylthiourea, and 0.75 parts of sulfur.

Press cure the composition in an 8 × 8 × ½ inch cavity mold for 20 minutes at 300°F. Remove the hot molded slab from the mold and measure it. Its size is 11½ × 11⅝ inches.

Place the slab in an oven and heat it at 350°F. for 15 minutes. Cool it and measure and test it. The expanded slab is 17¾ × 17¼ inches and has a density of 5.8 pounds/cubic foot, a Shore 00 hardness (skin surface) of 61, and a Shore 00 hardness (split surface) of 54.

EXAMPLE IX

Prepare a rubber composition from 130.0 parts of polychloroprene, 60.0 parts of a 1:1 mixture of a butadiene-styrene copolymer having a combined styrene content of 23.5 percent and a styrenebutadiene copolymer having a combined styrene content of about 85 percent, 4.0 parts of magnesium oxide, 50.0 parts of talc, 15.0 parts of naphthenic oil, 1.0 part of petrolatum, 5.0 parts of zinc oxide, 0.5 part of 2,2'-methylenebis(4-methyl-6-t-butylphenol), 13.0 parts of azodicarbonamide, 1.0 part of stearic acid, 0.25 part of 1,3-diethyl thiourea, 0.25 part of 1,3-dibutyl thiourea, and 0.75 part of sulfur.

Press cure the composition in an 8 inch × 8 inch × ¼ inch cavity mold for 10 minutes at 295°F. Remove the hot molded slab from the mold and measure it. Its size is 9¼ inches × 9 inches.

Place the slab in an oven and heat it at 350°F. for 15 minutes. Cool it and measure and test it. The expanded slab is 17¾ inches × 17 inches and has a density of 7.3 pounds/cubic foot, a Shore 00 hardness (skin surface) of 60, and a Shore 00 hardness (split surface) of 57.

It is obvious that many variations may be made in the products and processes set forth above without departing from the spirit and scope of this invention.

What is claimed is:

1. In a process for preparing a cellular rubber by heating a composition comprising (A) a vulcanizable rubber selected from the group consisting of butyl rubber, chlorinated butyl rubber, brominated butyl rubber, ethylene-propylene copolymer, ethylene-propylene-diene terpolymer, chlorosulfonated polyethylene, natural rubber, synthetic polyisoprene, polybutadiene, butadiene-styrene copolymer, butadiene-acrylonitrile copolymer, polychloroprene, polyacrylate, polyepichlorohydrin, epichlorohydrin-ethylene oxide copolymer, and mixtures thereof, (B) a vulcanizing agent, and (C) a blowing agent to cure and expand the rubber, the improvement which comprises initiating cure of the rubber by heating the composition under a pressure of about 1,000–2,000 psi in a mold at a temperature within the range of about 220°–400°F. which is lower than that at which substantial decomposition of the blowing agent occurs, removing the partially cured rubber composition from the mold, and completing cure of the rubber at a higher temperature within the range of about 300°–420°F. which permits substantial decomposition of the blowing agent and expansion of the composition.

2. The process of claim 1 wherein the vulcanizable rubber is butyl rubber.

3. The process of claim 1 wherein the vulcanizable rubber is a mixture of butyl rubber and ethylene-propylene-diene terpolymer.

4. The process of claim 1 wherein the composition additionally comprises up to 80 percent by weight of a compatible thermoplastic resin, based on the combined weights of rubber and resin; said thermoplastic resin being selected from the group consisting of polyethylene, ethylene-vinyl acetate copolymer, chlorinated polyethylene, polypropylene, polybutylene, polyvinyl chloride, vinyl chloride-vinyl acetate copolymer, polyvinylidene chloride, vinylidene chloride-vinyl chloride copolymer, polyvinyl ether, polystyrene, styrene-butadiene copolymer, and mixtures thereof.

5. The process of claim 4 wherein the thermoplastic resin is polyethylene.

* * * * *

PO-1050
(5/69)

UNITED STATES PATENT OFFICE
CERTIFICATE OF CORRECTION

Patent No. 3,855,378  Dated December 17, 1974

Inventor(s) Barry Topcik

It is certified that error appears in the above-identified patent and that said Letters Patent are hereby corrected as shown below:

Column 3, line 57, the "a" before "stearic acid" should be deleted. Column 4, line 44, "350°" should read --the--, and "350+" should read --350°--. Column 5, line 9, "zince" should read --zinc--.

Signed and sealed this 18th day of February 1975.

(SEAL)
Attest:

RUTH C. MASON
Attesting Officer

C. MARSHALL DANN
Commissioner of Patents
and Trademarks